United States Patent [19]

Kuhlmann et al.

[11] Patent Number: 4,628,608
[45] Date of Patent: Dec. 16, 1986

[54] GUIDE DEVICE FOR HAND-HELD MACHINE TOOLS

[75] Inventors: Gerhard Kuhlmann, Stuttgart; Erwin Wolf, Weissach i.T., both of Fed. Rep. of Germany

[73] Assignee: Robert Bosch GmbH, Stuttgart, Fed. Rep. of Germany

[21] Appl. No.: 684,910

[22] Filed: Dec. 21, 1984

[30] Foreign Application Priority Data

Apr. 6, 1984 [DE] Fed. Rep. of Germany ... 8410794[U]

[51] Int. Cl.⁴ ............................................. B23D 51/04
[52] U.S. Cl. ........................................ 30/373; 30/293; 83/745
[58] Field of Search .................. 30/372, 373, 293; 83/745, 743

[56] References Cited

U.S. PATENT DOCUMENTS

| | | | |
|---|---|---|---|
| 2,676,624 | 4/1954 | Gecmen | 30/373 |
| 4,016,649 | 4/1977 | Kloster | 30/373 |
| 4,065,114 | 12/1977 | Pennington | 83/745 X |
| 4,077,292 | 3/1978 | Cole | 30/372 X |
| 4,125,942 | 11/1978 | Horner et al. | 83/745 X |
| 4,138,914 | 2/1979 | Reeder | 83/745 |
| 4,335,512 | 6/1982 | Sheps et al. | 83/745 X |
| 4,414,745 | 11/1983 | Kuhlmann et al. | 30/373 |

*Primary Examiner*—E. R. Kazenske
*Assistant Examiner*—Willmon Fridie, Jr.
*Attorney, Agent, or Firm*—Michael J. Striker

[57] ABSTRACT

A guide device for hand-held machine tools includes a foot plate in which a guide rail, provided with a parallel guide, can be clamped. The foot plate has guide openings in its edge portions. The guide rail is insertable into these openings. The clamping device is displaceable on the guide rail and can be clamped to the latter. The clamping device includes a clamping element with an overhanging clamping projection, which is engageable with the edge portion of the foot plate, and a clamping bolt for clamping the clamping element to the guide rail. The clamping bolt can be moved out from the narrow space between the foot plate and the machine housing and can be easily accessible.

8 Claims, 8 Drawing Figures

GUIDE DEVICE FOR HAND-HELD MACHINE TOOLS

BACKGROUND OF THE INVENTION

The present invention relates to hand-held machine tools in general, and more particularly to a guide device for such hand-held machine tools.

Guiding devices of the type under consideration, which serve the purpose of guiding the tool for making parallel cuts and circular cuts, have been known. A foot plate of the hand-held machine tool in such devices has a support and a clamping device for a guide rail. The foot plate for operations with hand-guided machine tools must be, in the majority of cases, held relatively narrow in order not to hinder cuts near the edges. Therefore the foot plate carries the devices for pivoting the base plate relative to the machine body and for locking the foot plate in a desired adjustment position. However, particularly with compass saws and also with circular hand-held saws, a free space on the upper side of the foot plate between the foot plate and the machine body and near the guide rail is rather narrow. The clamping and releasing of the guide rail has been therefore specifically difficult and complicated. Furthermore, with the known arrangement it is required that each hand-held machine tool be equipped with the clamping device although a user sometimes does not need such a device. Finally, movable components of the clamping device can be easily lost.

SUMMARY OF THE DISCLOSURE

It is an object of the present invention to provide an improved guide device for hand-held machine tools.

It is a further object of the invention to provide a guide device as an attachment for hand-held circular and compass saws.

These and other objects of the invention are attained by a guide device for a hand-held machine tool, comprising a foot plate connected to the machine tool; an elongated guide rail connectable to said foot plate, said foot plate having guide openings in which said guide rail is insertable and displaceable; and a clamping device for clamping said guide rail with said foot plate in an inserted position, said clamping device being supported on said guide rail and being displaceable thereon, said clamping device including a clamping projection adapted to overlap and engage a portion of said foot plate, and a clamping means for urging said projection to a clamping position on said portion of said foot plate.

The advantage of the guide device according to the present invention resides in that the clamping device is formed as an attachment with a number of guide rails and that the manipulation of this clamping device from outside within a narrow space between the foot plate and the machine body would be possible. Due to the provision of the clamping projection, which engages with the edge or portion of the foot plate, the clamping bolt or a similar clamping means and its gripping member are moved laterally of the foot plate. The clamping bolt is therefore freely accessible and can be operated with the aid of protective glooves. The foot plate should have only guide openings in the side walls, in which the guide rail can be inserted. The clamping device can be furnished with the guide rail as an attachment.

The hand-held machine tool should not necessarily include the clamping device. Thereby costs of the machine tools, which operate without guide devices, can be reduced.

The clamping means may be a clamping bolt, or a clamping lever or the like.

The clamping device may further include a clamp having two opposing tongues embracing said guide rail, and a third tongue extended in the direction of elongation of said guide rail and provided with said projection, said clamping bolt being screwed in a middle portion of said clamp and urging said third tongue with said projection to the clamping position.

The clamp may be made of spring sheet steel and formed of one-piece.

The clamping device may further include a resilient portion, the spring force of which acts in a direction counter to the direction of acting of a clamping force of said clamping means.

The clamping device may include a clamping yoke displaceably mounted on said guide rail, and a clamping element for clamping said rail with said foot plate and/or securing said clamping device to said guide rail.

The above-mentioned clamping means may be a clamping eccentric.

The clamping yoke and the clamping element may be formed of one piece.

The clamping yoke and the clamping element may be pressed out of synthetic plastic material.

The clamping bolt may have a threaded pin terminated with a rounded end, said rounded end being pressed against said guide rail.

The clamping bolt may have a handle-like head which is pressed against said guide rail.

The head of the bolt may have at a side thereof, facing said clamping element, a recess, said clamping element having an extension fitting into said recess.

The clamping device may further include an elastic member inserted between the head of the bolt and said clamping element.

The elastic member may be a soft-rubber disc.

The clamping yoke and the clamping element may be held together by said clamping bolt, and an elastic member may be inserted between said clamping element and said clamping yoke.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
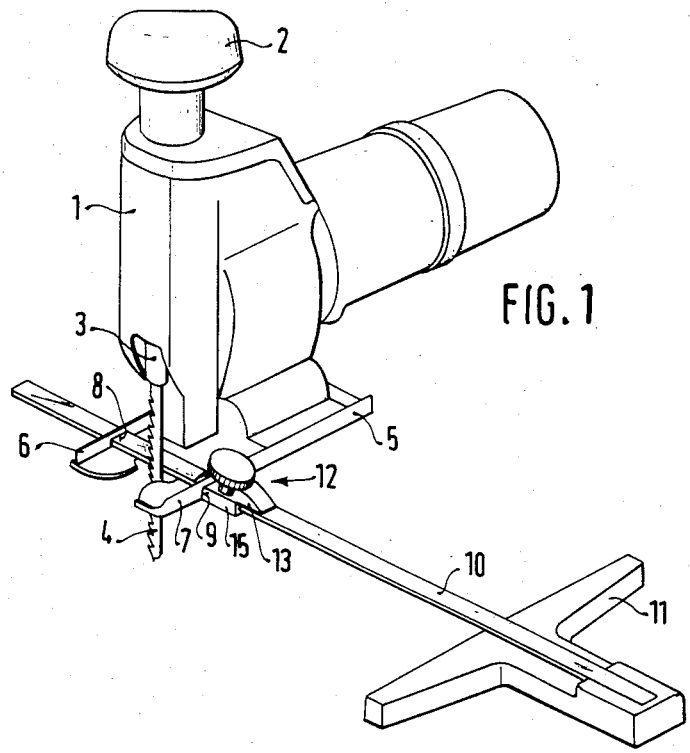
FIG. 1 is a perspective view of a compass saw with a guide device according to the invention.
Figure 3:
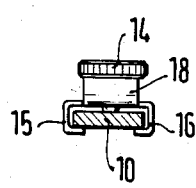
FIG. 3 is a view of FIG. 2 in the direction of arrow X.
Figure 2:
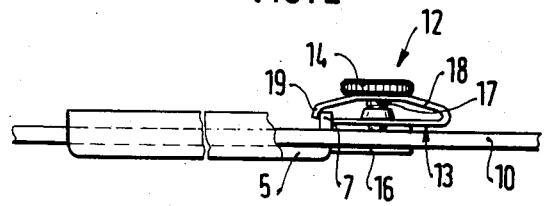
FIG. 2 is a side view, partially broken, of a guide unit.

Referring now to the drawings in detail, and first to FIGS. 1–3 thereof, a hand tool with a guide device of the invention is represented here by a compass saw which includes a machine body 1, an additional handle 2, a reciprocating rod 3 of known construction, in which a compass saw blade 4 is clamped, and a foot plate 5 pivotally connected to the machine body 1. The foot plate 5 includes vertically projecting or raised-up edges 6 and 7 worked into rectangular recesses 8 and 9. A guide rail 10 is slidably movable through recesses 8 and 9. The free end of guide rail 10 carries a parallel guide 11. A clamping device 12 is slidably positioned on the guide rail 12. This clamping device comprises a clamp 13 and a clamping bolt 14. Clamp 13 has two tongues 15 and 16 which embrace guide rail 10 from above. In the middle portion of clamp 13 is positioned a threaded tube 17 into which the clamping bolt 14 can be screwed. A third tongue 18 of clamp 13 extends in the direction of elongation of guide rail 10 and is drawn off from the side of clamp 13, facing away from the foot plate 5 over the threaded tube 17 and towards the foot plate 5. In the region of threaded tube 17 tongue 18 has a through bore for the threaded pin of the clamping bolt 14. The free end of tongue 18 forms a hook-like clamping projection 19 which can overlap edge 6, 7 of the foot plate and engage behind this edge. Clamp 13 is made of spring sheet steel. Tongue 18 is positioned under spring tension against the head of the clamping bolt 14. Tongue 18 acts as a resilient portion of clamp 13.

In order to adjust the distance between the saw blade 4 and the parallel guide 11 the clamping bolt 14 is loosened such that the clamping overhanging projection 19 holds the corresponding edge of the foot plate 5 but the guide rail 10 is not rigidly clamped. After the adjustment of a desired distance the clamping bolt 14 is then tightened by hand so that this bolt presses the end face of its threaded pin against the guide rail 10. Foot plate 5 and guide rail 10 become thereby clamped to each other by the clamping device 12. To take the guide rail 10 off the clamping bolt 14 should be loosened unless the clamping overhanging projection 19 of the clamp 13 can be lifted from the corresponding edge of the guide rail 10. Then the guide rail 10 can be pulled away from recesses 8 and 9. Such removed guide device with the guide rail 10 and the parallel guide 11 carries the clamping device 12 which can be undetachably clamped on the guide rail 10 by means of clamping bolt 14.

Figure 4:
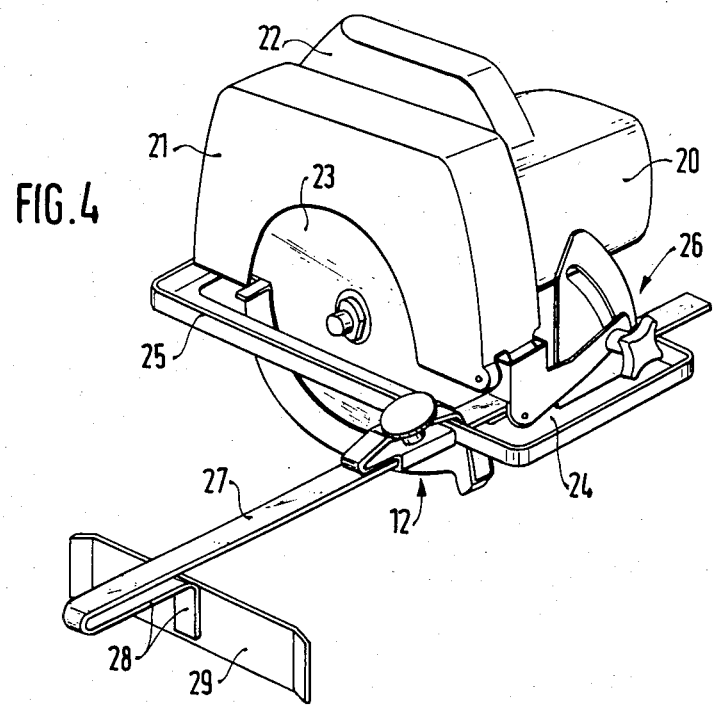
FIG. 4 is a perspective view of the hand circular saw with a guide device of another embodiment but with a clamping device of FIGS. 1-3.

FIG. 4 illustrates the guide device in conjunction with a hand-held circular saw. The latter includes a machine housing 20, a protective hood 21, a hand grip 22 and a circular saw blade 23. A foot plate 24 is connected to the protective hood 21. Foot plate 24 has raised-up edges 25. An inclination-adjusting device 26 serves the purpose of adjusting the position of foot plate 24 through an angle of 45°. In this embodiment a guide rail 27 is provided, on which a support 28 is formed for a parallel guide 29. The similar clamping device 12, described in conjunction with FIGS. 1–3, is utilized for the circular saw shown in FIG. 4.

Such clamping device is specifically advantageous for the circular saw. With such clamping device a sufficient free space on the upper surface of the foot plate 24 is available for adjusting device 26.

Figure 5:
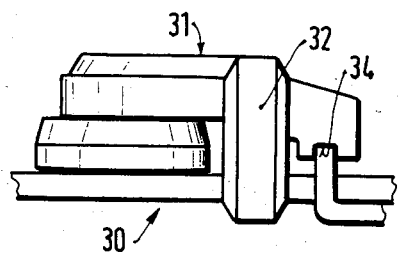
FIG. 5 is a side view of another embodiment of the clamping device with a clamp formed by injection molding, pressing or molding and with a specific arrangement of a clamping bolt.
Figure 6:
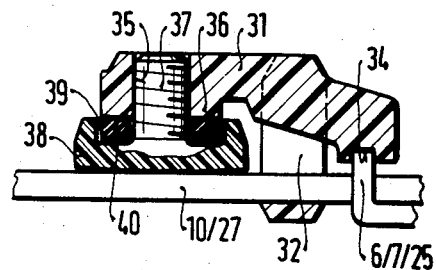
FIG. 6 a sectional view of FIG. 5.
Figure 7:
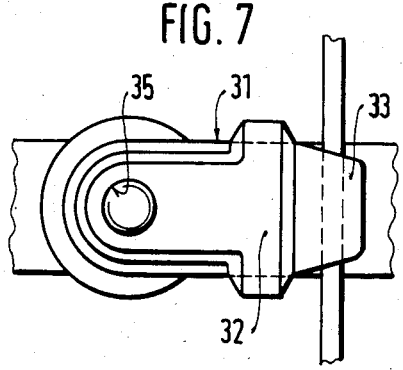
FIG. 7 a top plan view of FIG. 5.

FIGS. 5 through 7 illustrate another embodiment of the clamping device generally designated by reference numeral 30. This clamping device can be also formed of plastics. A clamping element 31 is provided with a yoke 32, through which the guide rail 10 or 27 can be guided. A clamping overhanging projection 33 has a groove 34 which fits over each of the edges 6, 7, 25. The middle portion of the clamping element 31 has a threaded bore 35. This bore is formed in a cylindrical projection 36 of element 31. A clamping bolt 37 is screwed into the threaded bore 35 from the side of element 31 facing the guide rail 10, 27. A knurled head 38 of clamping screw 37 has at its surface facing the clamping element 31 a recess 39 in which the projection 36 fits. A resilient and/or soft-elastic disc 40 is inserted into recess 39. Elastic disc 40 acts as a rotation lock for the clamping bolt 37.

With this clamping device 30 a complete construction, made of synthetic plastic material is offered, which has no bulky, outwardly projecting components. For securing the guide rail 10 or 27 the knurled head 38 of clamping bolt 37 is supported on the upper surface of the guide rail. Because the knurled head 38 has a portion, projecting beyond the width of the guide rail and the clamping element a sufficient gripping surface for hand manipulation is ensured.

Figure 8:
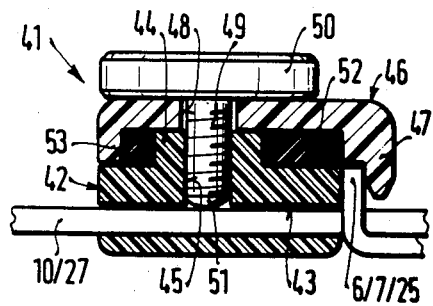
FIG. 8 is a sectional view of yet another embodiment of the clamping device for the guide device of the invention.

FIG. 8 illustrates still another embodiment of the clamping device which is denoted by reference numeral 41. In this embodiment clamping yoke 42 has a channel 43 for receiving therethrough of the guide rail 10 or 27. The clamping yoke 42 of the clamping device 41 further has an upwardly extending projection 44 in which a central threaded bore 45 is provided. A clamping element 46 is positioned above the clamping yoke 42. Clamping element 46 has a hook-shaped clamping overhanging projection 47. Clamping element 46 further has a through hole 48, into which a clamping bolt 49, screwed into bore 45, is inserted. A head 50 of the clamping bolt 49 is knurled to improve its gripping properties. A dome-shaped or round end 51 of the clamping bolt 49 can clamp clamping yoke 42 on the guide rail 10 or 27. Simultaneously the head 50 of the clamping bolt 49 presses the clamping element 46 with its clamping projection 47 against the edge 6, or 7, or 25 of the foot plate 5 or 24, respectively. A springy and/or soft elastic washer-type element 52 is inserted between the clamping hoke 42 and clamping element 46. Elastic element 52 embraces projection 44. A supporting nose or extension 53 of the clamping element 46 ensures the smallest distance between the clamping yoke 42 and clamping element 46.

It will be understood that each of the elements described above, or two or more together, may also find a useful application in other types of guide devices for hand-held machine tools differing from the types described above.

While the invention has been illustrated and described as embodied in a guide device for a hand-held machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A guide device for a hand-held machine tool, comprising a foot plate connected to the machine tool, and elongated guide rail, said foot plate having guide openings in which said guide rail is insertable and displaceable; and a clamping device for clamping said guide rail with said foot plate in an inserted position, said clamping device being supported immediately on said guide rail and being displaceable thereon, said clamping device including a clamping projection overlapping and engaging a portion of said foot plate to be clamped therewith, and clamping bolt for urging said projection to a clamping position said portion of said foot plate, said clamping device further including a clamp having two opposing tongues surrounding said guide rail, and a third tongue extended in the direction of elongation of said guide rail and provided with said projection, said clamping bolt being screwed into a middle portion of said clamp and urging said third tongue with said projection to the clamping position.

2. The guide device as defined in claim 1, wherein said clamp is made of spring sheet steel and formed of one-piece.

3. The guide device as defined in claim 2, wherein said projection is hook-shaped.

4. The guide device as defined in claim 1, wherein said clamping bolt has a thread pin terminated with a rounded end, said rounded end being pressed against said guide rail.

5. The guide device as defined in claim 1, wherein said clamping bolt has a handle-like head which is pressed against said guide rail.

6. The guide device as defined in claim 5, wherein said head has at a side thereof, facing said clamping element, a recess, said clamping element having an extension fitting into said recess.

7. The guide device as defined in claim 6, wherein said clamping device further includes an elastic member inserted between said head and said clamping element.

8. The guide device as defined in claim 7, wherein said elastic member is a soft-rubber disc.

* * * * *